O. G. PFEIFFER.
CLUTCH.
APPLICATION FILED NOV. 15, 1918.

1,372,245.

Patented Mar. 22, 1921.
2 SHEETS—SHEET 1.

Inventor:
OTTO G. PFEIFFER,
By John N. Bruninga
His Attorney

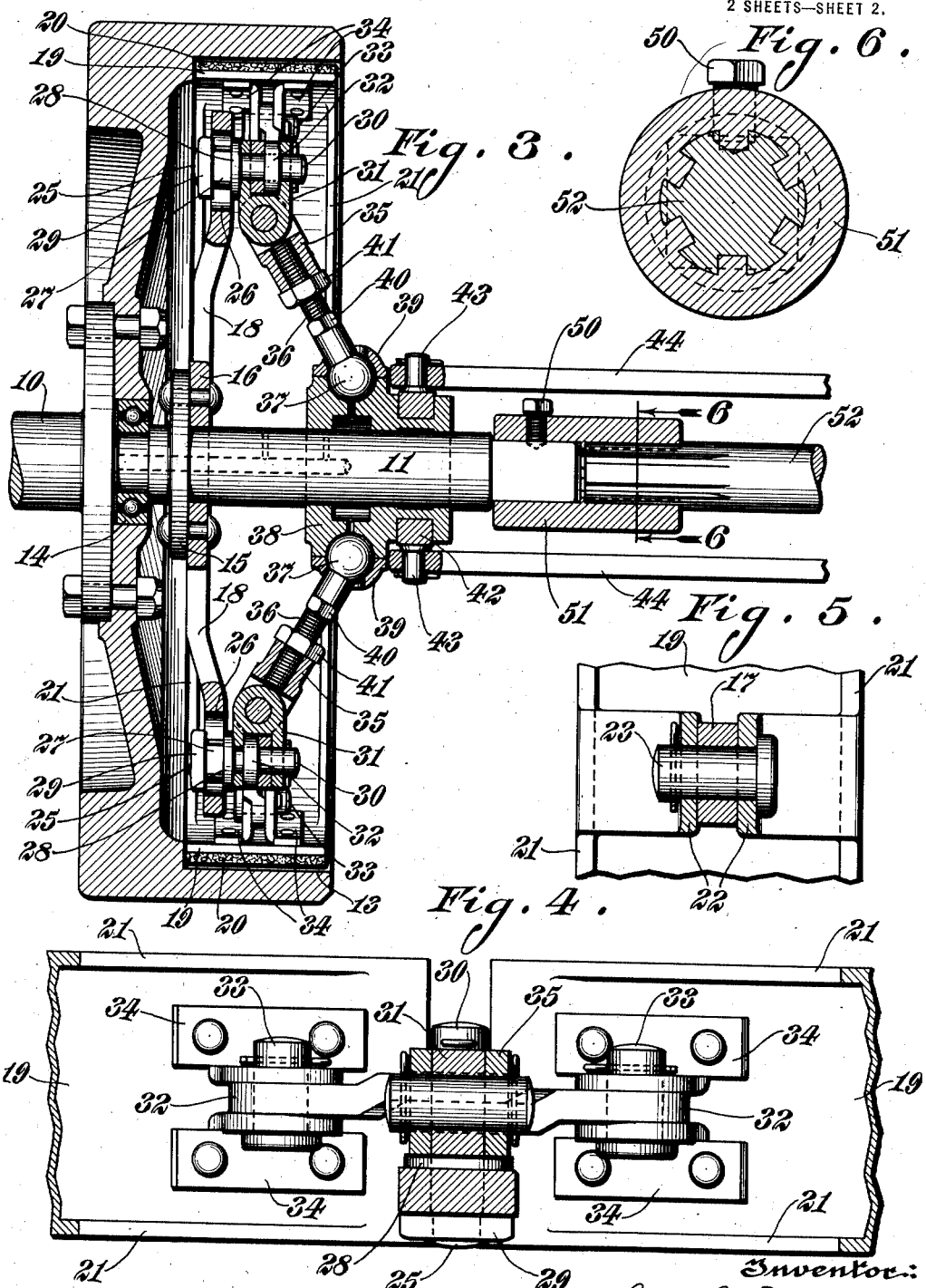

UNITED STATES PATENT OFFICE.

OTTO G. PFEIFFER, OF ST. LOUIS, MISSOURI, ASSIGNOR TO CLAROTTO MFG. CO., A CORPORATION OF WISCONSIN.

CLUTCH.

1,372,245.  Specification of Letters Patent.  Patented Mar. 22, 1921.

Application filed November 15, 1918. Serial No. 262,680.

*To all whom it may concern:*

Be it known that I, OTTO G. PFEIFFER, a citizen of the United States, and residing at St. Louis, Missouri, have invented the new and useful Improvement in Clutches, of which the following is a specification.

This invention relates to clutches, and more particularly to clutches of the drum and expanding band or ring type. As to some of its features, this invention is an improvement on United States Patent No. 1,153,854, granted September 14, 1915.

One of the objects of this invention is to improve the construction and operation of the clutch as described and shown in the specification of the patent referred to, so as to simplify its construction and render its action more effective and certain.

Further objects will appear from the detail description taken in connection with the accompanying drawing, in which, Figure 1 is a front elevation of a clutch embodying this invention;

Fig. 3 is a section on the line 3—3, Fig. 1;

Fig. 4 is an enlarged detail section on the line 4—4, Fig. 1;

Fig. 5 is a similar view on the line 5—5, Fig. 1; and,

Fig. 6 is an enlarged section on the line 6—6, Fig. 3.

Figure 1:
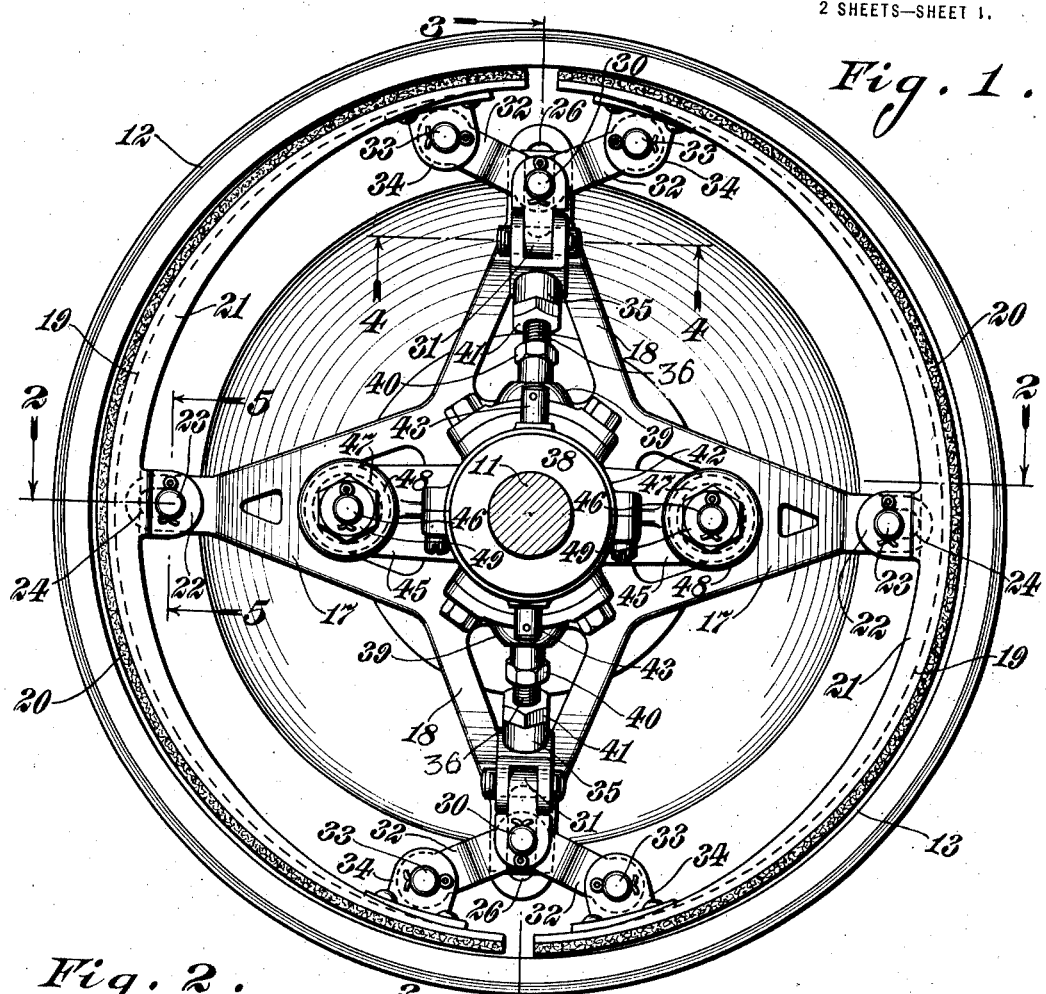
Figure 2:
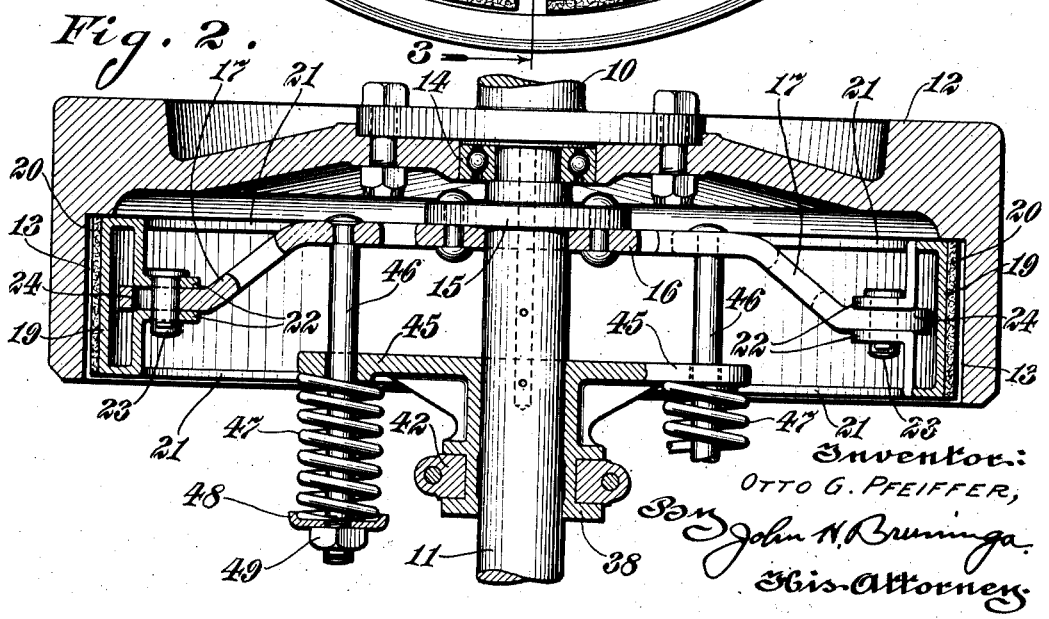
Fig. 2 is a section on the line 2—2, Fig. 1.

Referring to the accompanying drawings, 10 and 11 designates a pair of shafts, either one of which may be the driving or driven shaft; in automobile practice the shaft 10 is generally the driving shaft, while shaft 11 is the driven shaft. The shaft 10 has bolted thereon a fly-wheel 12 which is machined at 13 to form an inside friction surface, and this fly-wheel is provided with a seat for a roller bearing 14 supporting the end of the shaft 11.

The shaft 11 is provided with a flange 15 to which is bolted a frame 16 forming radially projecting arms 17 and 18. A pair of clutch shoes 19 are mounted on the arms 17 and 18 to engage the inside friction surface 13, these clutch shoes being constructed of sheet metal and faced with a suitable clutch facing 20 of asbestos, or any other suitable material. Each of these shoes is provided with a pair of spaced ribs 21 formed by bending the sheet metal of the shoe, and these ribs have a maximum radial depth at the center of the shoe, and decrease to zero at the ends of the shoe, so as to provide a clutch shoe whose resistance to bending decreases from the center to the ends thereof. The ribs on a shoe, however, terminate short distances from the ends of the shoe, so as to render the ends thereof flexible, for a purpose hereinafter to be described. Each shoe is provided at its center with a pair of ears 22 formed by radial extensions of the ribs, and a pair of these ears embrace the ends of the arm 17, the ears being perforated to receive a pin 23 which engages an elongated slot 24 in the arm, thereby permitting free radial movement of the clutch shoe at its point of support toward and from the friction surface.

The arms 18 have each mounted therein a pin 25 which engages an elongated slot 26 in the arm. This pin has a flattened guiding portion 27 engaging the slot, and is provided with a collar 28 and a nut 29 engaging the side faces of the arm, thereby guiding this pin for free radial movement in the arm, but at the same time restraining axial movement thereof. This pin has an axial bearing portion 30 upon which is mounted a clevis 31, and between the spaced arms of this clevis are a pair of links 32 engaging at their meeting ends the pin, and connected at their outer ends to pins 33 mounted in brackets 34 attached to the meeting ends of the clutch shoes 19. These brackets 34 are formed from the body of the clutch shoe by bending the material from the edges inwardly and radially so as to form an integral structure, and it will be noted that the ribs 21 terminate short distances from these brackets.

Each clevis 31 is connected to a clevis 35 in which is a threaded link 36 having a ball 37 engaging a corresponding socket in a sleeve 38 sliding on the shaft 11, this ball being retained by a cap 39 bolted to the sleeve. The link 36 is provided with a squared portion 40, so that it may be turned while it is locked in adjusted position by a locknut 41. The sleeve 38 is grooved to receive a collar 42 having radial pins 43 engaged by links 44 connected with the usual clutch pedal.

The sleeve 38 is provided with radial arms 45, through which pass pins 46 attached to the arms 17, and encircling each of these pins is a strong spring 47, bearing at one end against an arm 45, and at its other end against a washer 48 retained by a nut 49, so that the tension of the spring may be adjusted. The springs serve to move the sleeve 38 to the left, Fig. 3, thereby acting to expand the clutch shoes to engage the friction surface, while the clutch shoes are disengaged from the friction surface by the usual clutch pedal acting through the connections heretofore described.

The shaft 11 has attached thereto by a set screw 50, a collar 51 which has a driving connection with a propeller shaft 52, as shown in Figs. 3 and 6.

Upon reference to Fig. 1 it will be noted that while the friction surface 13 is concentric with the axis of the shafts 10 and 11, the coöperating faces of the assembled clutch shoes are elliptical, with the long axis of the ellipse along the arms 18, and the short axis along the arms 17; accordingly, the clutch shoes will be closer to the friction surface at their free ends, than at their centers, when the clutch shoes are disengaged, and accordingly when the clutch shoes are moved into engagement with the friction surface, the ends will engage first. The purpose of this construction will be described more fully hereinafter.

In operation the clutch is thrown in by releasing the clutch pedal when the springs will straighten the double or compound toggle links between the sleeve and the toggle links connected with the shoes. Such a movement will first operate to move the free ends of the shoes into engagement with the friction surface, and thereafter these clutch shoes will engage gradually from the ends to the center thereof, until they are fully in engagement. This would ordinarily cause these clutch shoes to engage suddenly, if it were not for the fact that these clutch shoes are provided with the strengthening ribs which offer a resistance to bending of the clutch shoes as they engage the friction surface, this resistance decreasing from the center to the ends. Accordingly, during the operation of engaging these clutch shoes, the ends engage first and then the engagement will be gradually from the ends to the center of a clutch shoe, the clutch shoe moving out freely at its center on account of the movable connection with its supporting arm. Accordingly, a gradual engagement of the clutch shoes is insured, so that the power will be applied gradually from the driving shaft to the driven shaft. As the clutch is disengaged by the depression of the pedal, the disengagement is gradual, the shoes disengaging first at their centers, and then gradually toward the ends thereof, until they are completely disengaged.

On account of the provision of the ribs, the clutch shoes when moved to disengage the friction surface, disengage first at their free ends, the flexible free extreme ends, permitting such radial disengagement, but the comparatively rigid ribs cause the shoes to be forcibly withdrawn from the friction surface, so that no dragging of these clutch shoes will take place.

As in the patent referred to, the clutch shoes are mounted intermediate their ends, so as not only to move freely toward and from the friction surface, but also to permit slight movement along and transversely of the friction surface, the connections being loose enough to permit such action. This results in a uniform engagement of the clutch shoes, with the advantages described in the patent referred to.

It is obvious that various changes may be made in the details without departing from the spirit of this invention. It is, therefore, to be understood that this invention is not to be limited to the specific construction shown and described.

Having thus described the invention, what is claimed is:

1. In a clutch, a pair of clutch members, one of said clutch members having an inside friction surface, a flexible band shoe adapted to expand and engage said friction surface, means for supporting said shoe on the other clutch member, constructed to permit free bodily movement at the point of support thereof toward and from said friction surface, and means connected to the ends of said shoe for moving the same into engagement with said friction surface, the shoe, when disengaged, being a greater distance from said friction surface at its center than at its ends and adapted for its ends to move first into clutching action.

2. In a clutch, a pair of clutch members, one of said clutch members having an inside friction surface, a flexible band shoe adapted to expand and engage said friction surface, means for supporting said shoe on the other clutch member, constructed to permit free bodily movement at the point of support thereof toward and from said friction surface, and means connected to the ends of said shoe for moving the same into engagement with said friction surface, the shoe, when disengaged, being a greater distance from said friction surface at its center than at its ends and adapted for its ends to move first into clutching action, and said shoe being constructed so as to have greater resistance to bending at its center than at its ends.

3. In a clutch a pair of clutch members, one of said clutch members having an inside friction surface, a flexible band shoe adapted to expand and engage said friction surface, means for supporting said shoe on the other clutch member, constructed to permit free bodily movement at the point of support thereof toward and from said friction surface, and means connected to the ends of said shoe for moving the same into engagement with said friction surface, the shoe, when disengaged, being maintained through its inherent resiliency a greater distance from said friction surface at its center than at its ends and adapted for its ends to move first into clutching action.

4. In a clutch, a pair of clutch members, one of said clutch members having an inside friction surface, a flexible band shoe adapted to expand and engage said friction surface, means for supporting said shoe on the other clutch member, constructed to permit free bodily movement at the point of support thereof toward and from said friction surface, and means connected to the ends of said shoe for moving the same into engagement with said friction surface, the shoe, when disengaged, being maintained through its inherent resiliency a greater distance from said friction surface at its center than at its ends and adapted for its ends to move first into clutching action, and said shoe being constructed so as to have greater resistance to bending at its center than at its ends.

5. In a clutch, a pair of clutch members, one of said clutch members having an inside friction surface, a flexible band shoe adapted to expand and engage said friction surface, means for supporting said shoe on the other clutch member, constructed to permit free bodily movement at the point of support thereof toward and from said friction surface, and means connected to the ends of said shoe for moving the same into engagement with said friction surface, the engaging surface of said shoe when disengaged being eccentric with respect to said friction surface and adapted for the ends of the shoe to move first into clutching action.

6. In a clutch, a pair of clutch members, one of said clutch members having an inside friction surface, a unitary flexible band shoe mounted on the other clutch member adapted to expand and engage said friction surface, said shoe being constructed so as to have greater inherent resistance to bending at its center than at its ends.

7. In a clutch, a pair of clutch members, one of said clutch members having an inside friction surface, a flexible band shoe mounted on the other clutch member adapted to expand and engage said friction surface, said shoe having a strengthening rib increasing in radial depth from its ends to its center.

8. In a clutch, a pair of clutch members, one of said clutch members having an inside friction surface, a flexible band shoe mounted on the other clutch member adapted to expand and engage said friction surface, said shoe having a pair of axially spaced strengthening ribs increasing in radial depth from its ends to its center.

9. In a clutch, a pair of clutch members, one of said clutch members having an inside friction surface, a flexible band shoe mounted on the other clutch member adapted to expand and engage said friction surface, said shoe having a pair of axially spaced strengthening ribs increasing in radial depth from its ends to its center, and means attached to said ribs at the center of the shoe adapted to support said shoe.

In testimony whereof I affix my signature this 8th day of April, 1918.

OTTO G. PFEIFFER.